(12) United States Patent
Wang (10) Patent No.: US 12,356,309 B2
(45) Date of Patent: Jul. 8, 2025

(54) SIDELINK CONFIGURATION AND TRAFFIC FORWARDING FOR LAYER-2 UE-TO-UE RELAY

(71) Applicant: MediaTek Singapore Pte. Ltd., Singapore (SG)

(72) Inventor: Xuelong Wang, Beijing (CN)

(73) Assignee: MediaTek, Singapore (SG)

( * ) Notice: Subject to any disclaimer, the term of this patent is extended or adjusted under 35 U.S.C. 154(b) by 466 days.

(21) Appl. No.: 17/827,974

(22) Filed: May 30, 2022

(65) Prior Publication Data

US 2022/0338092 A1    Oct. 20, 2022

Related U.S. Application Data

(63) Continuation of application No. PCT/CN2021/070873, filed on Jan. 8, 2021, which is a continuation of application No. PCT/CN2020/071151, filed on Jan. 9, 2020.

(51) Int. Cl.
*H04W 40/22* (2009.01)
*H04W 76/14* (2018.01)
*H04W 88/06* (2009.01)

(52) U.S. Cl.
CPC ........... *H04W 40/22* (2013.01); *H04W 76/14* (2018.02); *H04W 88/06* (2013.01)

(58) Field of Classification Search
CPC ... H04W 76/14; H04W 12/065; H04W 88/04; H04W 12/06; H04W 76/12; H04L 63/0281; H04L 63/0884
See application file for complete search history.

(56) References Cited

U.S. PATENT DOCUMENTS

| | | | |
|---|---|---|---|
| 2018/0054237 A1* | 2/2018 | Tseng | H04W 36/0022 |
| 2020/0351965 A1* | 11/2020 | Ugurlu | H04W 88/085 |
| 2021/0212151 A1* | 7/2021 | Paladugu | H04W 76/28 |

FOREIGN PATENT DOCUMENTS

WO    WO-2016182597 A1 * 11/2016 ............ H04W 4/023

OTHER PUBLICATIONS

International Search Report and Written Opinion of International Search Authority for PCT/CN2021/070873 dated Jan. 8, 2021 (10 pages).

* cited by examiner

*Primary Examiner* — Marisol Figueroa
(74) *Attorney, Agent, or Firm* — Helen Mao; Imperium Patent Works (57) ABSTRACT

Apparatus and methods are provided for sidelink configuration and traffic forwarding for L2 UE-to-UE relay. In one novel aspect, the relay UE configures sidelink configuration for both direct PC5 link between the relay UE and the remote UE and indirect PC5 link between two remote UEs. The relay UE performs traffic forwarding for remote UEs based on the adaptation information included within the SL-SCH sub-header of PC5 MAC sub-PDU. In one embodiment, the UE establishes sidelinks, configures end-to-end SLRB, activates the end-to-end SLRB, and forwards data packets between the remote UEs based on bearer mapping. The end-to-end SLRBs are activated automatically or are activated by a PC5 MAC control element (CE) or RRC message between the remote UEs. In another embodiment, the bearer mapping correlates the end-to-end SLRB ID with a plurality of sidelink relay channel IDs.

20 Claims, 6 Drawing Sheets

SIDELINK CONFIGURATION AND TRAFFIC FORWARDING FOR LAYER-2 UE-TO-UE RELAY

CROSS REFERENCE TO RELATED APPLICATIONS

This application is filed under 35 U.S.C. § 111(a) and is based on and hereby claims priority under 35 U.S.C. § 120 and § 365(c) from International Application No. PCT/CN2021/070873, titled "Methods and Apparatus of Sidelink Configuration and Traffic Forwarding for Layer-2 UE-to-UE Relay," with an international filing date of Jan. 8, 2021. International Application No. PCT/CN2021/070873 in turn, claims priority under 35 U.S.C. § 120 and § 365(c) from International Application No. PCT/CN2020/071151, titled "Methods and Apparatus of Sidelink Configuration and Traffic Forwarding for Layer-2 UE-to-UE Relay," with an international filing date of Jan. 9, 2020. This application is a continuation of International Application No. PCT/CN2021/070873. International Application No. PCT/CN2021/070873 is pending as of the filing date of this application, and the United States is an elected state in International Application No. PCT/CN2021/070873. The disclosure of each of the foregoing documents is incorporated herein by reference.

TECHNICAL FIELD

The disclosed embodiments relate generally to wireless communication, and, more particularly, to sidelink configuration and traffic forwarding for layer-2 UE-to-UE relay.

BACKGROUND 5G radio access technology will be a key component of the modern access network. It will address high traffic growth and increasing demand for high-bandwidth connectivity. In 3GPP New Radio (NR), sidelink continues evolving. With new functionalities supported, the sidelink offers low latency, high reliability and high throughout for device to device communications. Using sidelink for wireless relay provides a reliable and efficient way for traffic forwarding. For the early sidelink-based wireless relay services, such as the ProSe UE-to-Network relay, the traffic between the remote UE and the base station is forwarded at the IP layer by the relay UE. The evolved ProSe UE-to-Network Relay UE is expected to forward the traffic between the Remote UE and the Base Station at an adaptation layer between radio link control (RLC) and packet data convergency protocol (PDCP). 3GPP also specifies the support of Integrated Access Backhaul (IAB) for NR to support Layer-2 based relaying operation between the UE and the donor base station. The sidelink configuration for relay and the data packet for relay is under discussion to provide the most efficient and reliable sidelink relay. Further, the UE-to-UE sidelink relay requires further study.

Improvements and enhancements are required for sidelink configuration and traffic forwarding for L2-based UE-to-UE relay.

SUMMARY

Apparatus and methods are provided for sidelink configuration and traffic forwarding for L2 UE-to-UE relay. In one novel aspect, the relay UE configures sidelink configuration for both direct PC5 link between the relay UE and the remote UE and indirect PC5 link between two remote UEs. The relay UE performs traffic forwarding for remote UEs based on the adaptation information included within the SL-SCH sub-header of PC5 MAC sub-PDU. The sidelink configuration for direct PC5 link includes RLC/MAC configuration. The Sidelink configuration for indirect PC5 link includes SDAP/PDCP configuration. The adaptation information includes end-to-end SLRB ID for one-hop based UE-to-UE relaying operation. The adaptation information includes both end-to-end SLRB ID and remote UE ID for multi-hop UE-to-UE relaying operation.

In one embodiment, the UE establishes a first sidelink channel with a first remote UE and a second sidelink channel with a second remote UE in a new radio (NR) network, configures a L2 sidelink relay path between the first remote UE and the second remote UE with an end-to-end sidelink radio bearer (SLRB) configuration, wherein the first sidelink channel and the second sidelink channel are in the relay path, activates the end-to-end SLRB between the first remote UE and the second remote UE, and forwards data packets between the first remote UE and the second remote UE with a bearer mapping based on the L2 sidelink path. In one embodiment, the first relay channel and the second relay channel are established based on PC5 RRC signal exchanges with the first remote UE and the second remote UE. In another embodiment, the end-to-end SLRB are activated automatically upon receiving of the end-to-end SLRB configuration by the first remote UE and the second remote UE. In yet another embodiment, the end-to-end SLRB are activated by a PC5 MAC control element (CE) between the first remote UE and the second remote UE. In one embodiment, the end-to-end SLRB are activated by a PC5 RRC message between the first remote UE and the second remote UE. In another embodiment, the relay UE sends a radio resource control (RRC) message with sidelink UE information (SUI) to a base station in the NR network, wherein the SUI includes a UE ID of the first remote UE and a UE ID of the second remote UE. In one embodiment, the RRC message further includes one or more relay elements comprising PC5 link quality information for one or more PC5 links of the relay UE and corresponding UE capability information of the first remote UE and the second remote UE. In another embodiment, the forwarding data packets is based on a remote UE ID field and an ID for the end-to-end SLRB in a MAC packet data unit (PDU) over the first or the second sidelink. In one embodiment, the forwarding data packets is based on an ID for the end-to-end SLRB in a MAC packet data unit (PDU) over the first or the second sidelink. In another embodiment, the bearer mapping correlates an ID of the end-to-end SLRB with at least one relay channel ID, wherein the relay channel ID corresponds to the first sidelink channel or the second sidelink channel.

This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
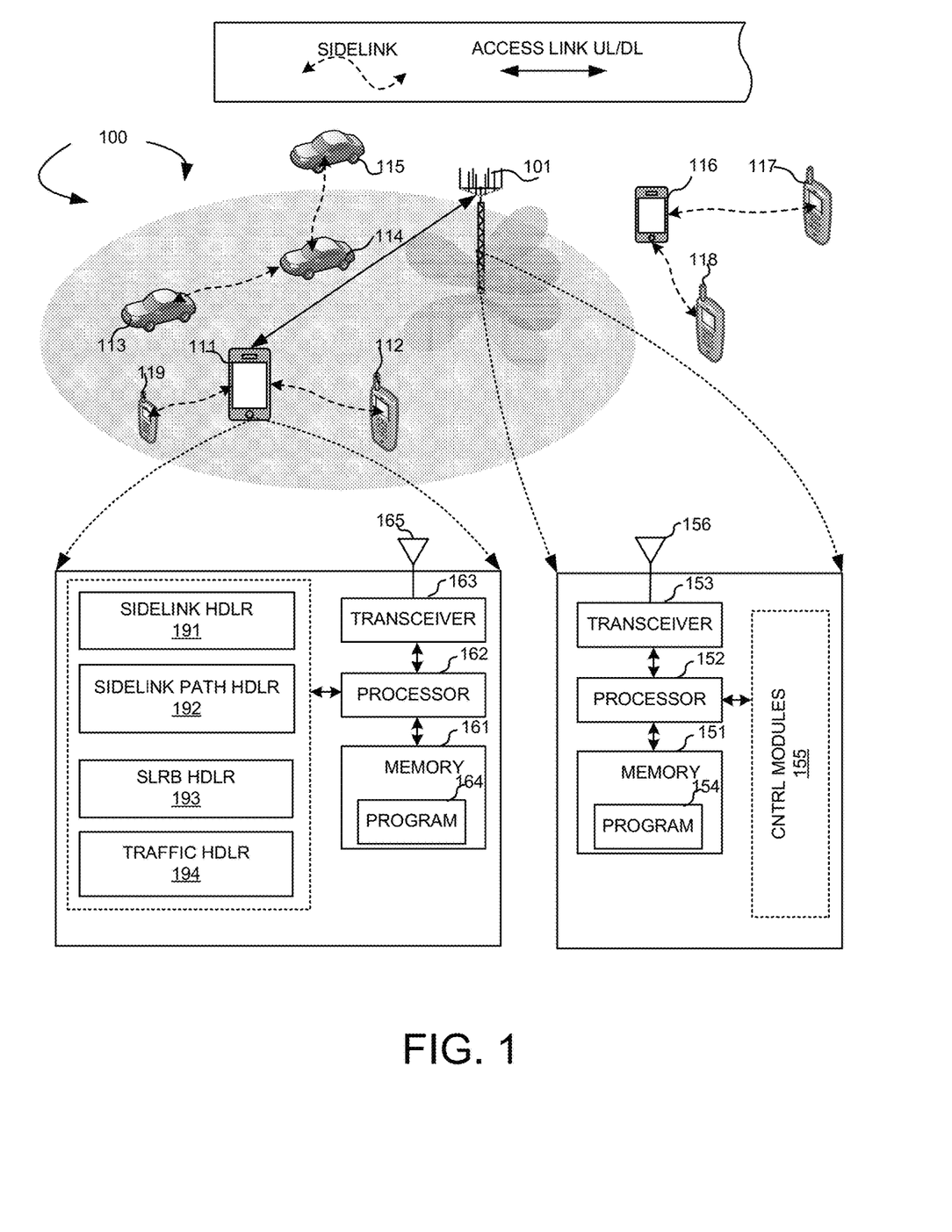
FIG. 1 is a schematic system diagram illustrating an exemplary wireless network for sidelink configuration and data forwarding for L2 UE-to-UE sidelink relay in accordance with embodiments of the current invention.

FIG. 1 is a schematic system diagram illustrating an exemplary wireless network for sidelink configuration and data forwarding for L2 UE-to-UE sidelink relay in accordance with embodiments of the current invention. Wireless system 100 includes one or more fixed base infrastructure units forming a network distributed over a geographical region. The base unit may also be referred to as an access point, an access terminal, a base station, a Node-B, an eNode-B (eNB), a gNB, or by other terminology used in the art. The network can be a homogeneous network or heterogeneous network, which can be deployed with the same frequency or different frequency. gNB 101 is an exemplary base station in the NR network.

Wireless network 100 also includes multiple communication devices or mobile stations, such as user equipments (UEs) 111, 112, 113, 114, 115, 116, 117, 118, and 119. The exemplary mobile devices in wireless network 100 have sidelink capabilities. The mobile devices can establish one or more connections with one or more base stations, such as gNB 101. UE 111 has an access link, with uplink (UL) and downlink (DL), with gNB 101. UE 112 and UE 119, which are also served by gNB 101, may also establish UL and DL with gNB 101. UE 111 also establishes a sidelink with UE 112, and a sidelink with UE 119. UEs 111, 112, and 119 are in-coverage devices. Mobile devices on vehicles, such as mobile devices 113, 114, and 115, also have sidelink capabilities. Mobile device 113 and mobile device 114 are covered by gNB 101. Mobile device 113, an in-coverage device, establishes sidelink with mobile device 114, which is also an in-coverage device. Mobile device 115 on a vehicle, however, is an out-of-coverage device. In-coverage mobile device 114 establishes a sidelink with the out-of-coverage device 115. In other embodiments, the mobile devices, such as UEs 116, 117, and 118, are all out-of-coverage but can transmit and receive data packets with other mobile stations with sidelink connections. A out-of-range UE-to-UE sidelink relay is established with relay UE 116 establishes sidelink with UE 117 and UE 118.

FIG. 1 further illustrates simplified block diagrams of a base station and a mobile device/UE for early packet filtering for UE sidelink relay. gNB 101 has an antenna 156, which transmits and receives radio signals. An RF transceiver circuit 153, coupled with the antenna, receives RF signals from antenna 156, converts them to baseband signals, and sends them to processor 152. RF transceiver 153 also converts received baseband signals from processor 152, converts them to RF signals, and sends out to antenna 156. Processor 152 processes the received baseband signals and invokes different functional modules to perform features in gNB 101. Memory 151 stores program instructions and data 154 to control the operations of gNB 101. gNB 101 also includes a set of control modules 155 that carry out functional tasks to communicate with mobile stations.

UE 111 has an antenna 165, which transmits and receives radio signals. An RF transceiver circuit 163, coupled with the antenna, receives RF signals from antenna 165, converts them to baseband signals, and sends them to processor 162. In one embodiment, the RF transceiver may comprise two RF modules (not shown). A first RF module is used for HF transmitting and receiving, and the other RF module is used for different frequency bands transmitting and receiving, which is different from the HF transceiver. RF transceiver 163 also converts received baseband signals from processor 162, converts them to RF signals, and sends out to antenna 165. Processor 162 processes the received baseband signals and invokes different functional modules to perform features in the UE. Memory 161 stores program instructions and data 164 to control the operations of THE UE. Antenna 165 sends uplink transmission and receives downlink transmissions to/from antenna 156 of gNB 101.

The UE also includes a set of control modules that carry out functional tasks. These control modules can be implemented by circuits, software, firmware, or a combination of them. A sidelink handler 191 establishes a first sidelink channel with a first remote UE and a second sidelink channel with a second remote UE in a NR network. A sidelink path handler 192 configures a Layer-2 (L2) sidelink relay path between the first remote UE and the second remote UE with an end-to-end sidelink radio bearer (SLRB) configuration, wherein the first sidelink channel and the second sidelink channel are in the relay path. An SLRB handler 193 activates the end-to-end SLRB between the first remote UE and the second remote UE. A traffic handler 194 forwards data packets between the first remote UE and the second remote UE with a bearer mapping based on the L2 sidelink path.

Figure 2:
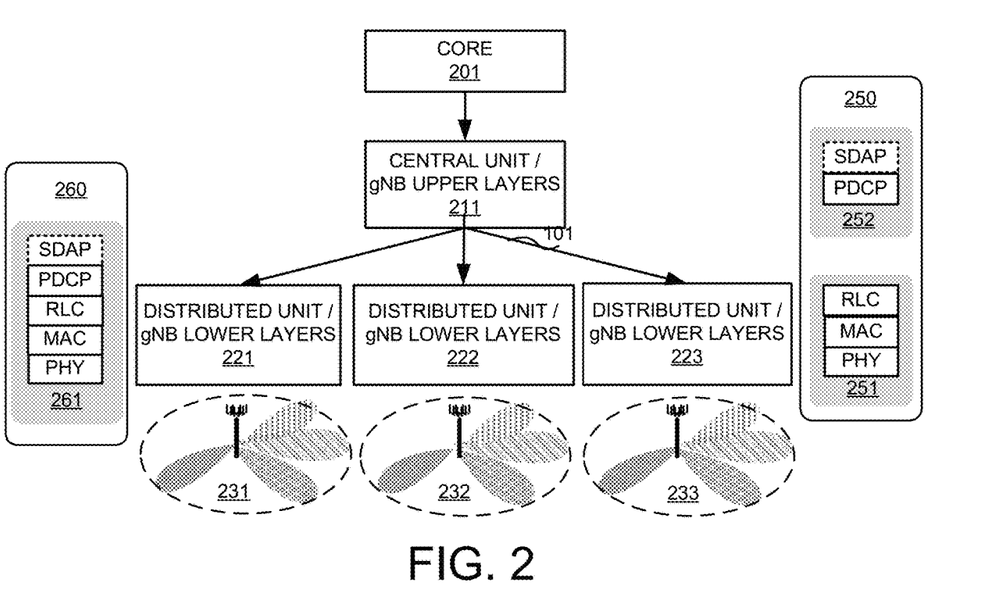
FIG. 2 illustrates an exemplary NR wireless system with centralized upper layers of the NR radio interface stacks in accordance with embodiments of the current invention.

FIG. 2 illustrates an exemplary NR wireless system with centralized upper layers of the NR radio interface stacks in accordance with embodiments of the current invention. Different protocol split options between central unit (CU) and distributed unit (DU) of gNB nodes may be possible. The functional split between the CU and DU of gNB nodes may depend on the transport layer. Low performance transport between the CU and DU of gNB nodes can enable the higher protocol layers of the NR radio stacks to be supported in the CU, since the higher protocol layers have lower performance requirements on the transport layer in terms of bandwidth, delay, synchronization and jitter. In one embodiment, SDAP and PDCP layer are located in the CU, while RLC, MAC and PHY layers are located in the DU. A core unit 201 is connected with one central unit 211 with gNB upper layer 252. In one embodiment 250, gNB upper layer 252 includes the PDCP layer and optionally the SDAP layer. Central unit 211 is connected with distributed units 221, 222, and 221. Distributed units 221, 222, and 223 each correspond to a cell 231, 232, and 233, respectively. The DUs, such as 221, 222 and 223 include gNB lower layers 251. In one embodiment, gNB lower layers 251 include the PHY, MAC and the RLC layers. In another embodiment 260, each gNB has the protocol stacks 261, including SDAP, PDCP, RLC, MAC and PHY layers.

In one novel aspect, the relay UE configures sidelink configuration for both direct PC5 links between the relay and the remote UE and the indirect PC5 link between the two remote UEs. There are different scenarios for UE-to-UE sidelink relay. In one scenario, the remote UE and the one or more relay UEs are all within the network coverage. In another scenario, one or more the UEs in the UE-to-UE relay are out-of-coverage UEs. The out of coverage UE can be a relay UE or a remote UE. In yet another scenario, all UEs in the UE-to-UE relay path are out-of-coverage UEs. The following diagrams illustrates different configuration scenarios for the UE-to-UE L2 sidelink relay.

Figure 3:
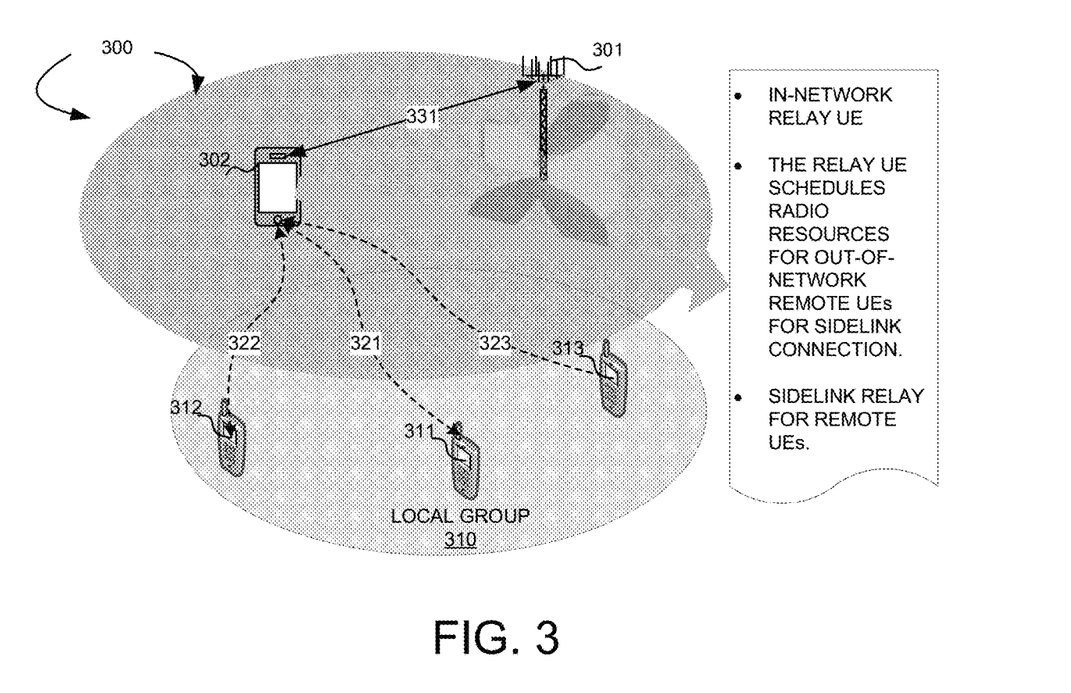
FIG. 3 illustrate an exemplary diagram of NR UE-to-UE sidelink relay with the relay UE connected with the network in accordance with embodiments of the current invention.

FIG. 3 illustrate an exemplary diagram of NR UE-to-UE sidelink relay with the relay UE connected with the network in accordance with embodiments of the current invention. The NR network 300 has a gNB 301, a relay UE 302, and remote UEs 311, 312, and 313. Relay UE 302 is connected with the network through a Uu interface with uplink (UL) and downlink (DL) 331. In one embodiment, the out-of-coverage UEs, such as UEs 311, 312, and 313 form a local group 310. Relay UE 302 schedules the radio resources for the group of remote UEs, such as UE 311, UE 312, and UE 313 according to the network configuration. Relay UE 302 can relay data and signaling among the device members of the local group 310, which are out of the network coverage. In one embodiment, relay UE 302 operates as a Layer-2 relay. There is an NR Uu air interface between gNB 301 and relay UE 302. There is PC5 interface, such as sidelinks 321, 322, and 323, between relay UE 302 and each remote UE, such as UEs 311, 312, and 313, respectively.

Figure 4:
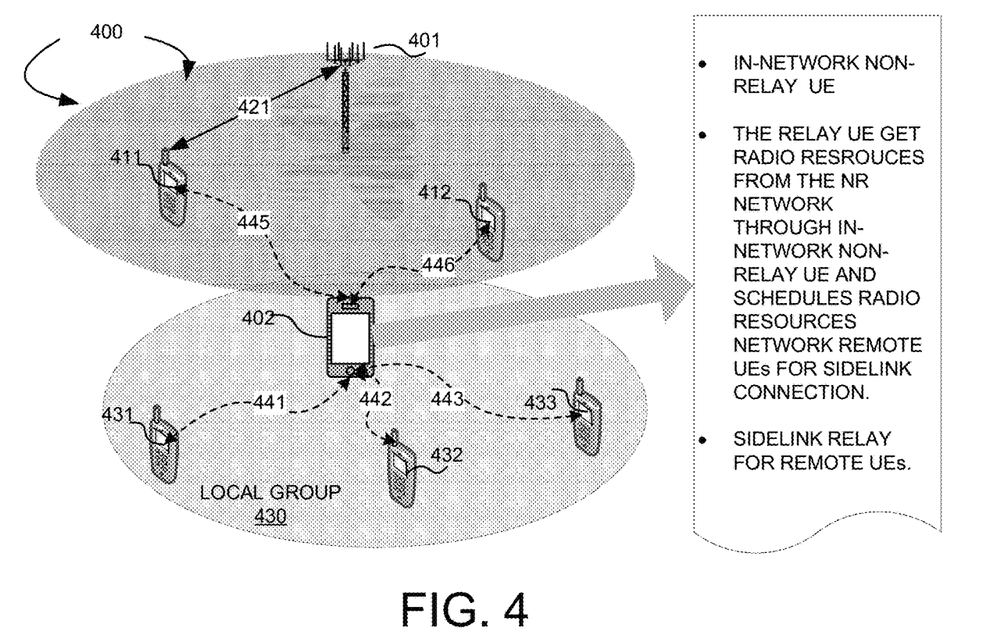
FIG. 4 illustrate an exemplary diagram of NR UE-to-UE sidelink relay with one remote UE connected with the network in accordance with embodiments of the current invention.

FIG. 4 illustrate an exemplary diagram of NR UE-to-UE sidelink relay with one remote UE connected with the network in accordance with embodiments of the current invention. The NR wireless network 400 includes a gNB 401, a relay UE 402, and remote UEs 411, 412, 431, 432, and 433. Remote UE 411 is connected to the NR network with gNB 401 through the Uu interface including UL and DL 421. Remote UEs 431, 432, and 433 are out-of-coverage UEs and forms a local group 430. Relay UE 402 establishes sidelinks 445 and 446 with in-network UEs 411 and 412, respectively. Relay UE 402 schedules the radio resources for the local group of remote UEs, such as UE 431, 432, and 433, according to the network configuration obtained from remote UE 411. Relay UE 402 relays data and signaling among the device members of the local group 430, which are out of the network coverage, or remote UE in the cell coverage, such as UE 412. This scenario applies when the remote UEs, such as UE 411 and 412, are not capable of relaying (e.g. during emergency case, only one device is in the coverage, but this device is not a relay device). In one embodiment, relay UE 402 performs as Layer-2 Relay. Relay UE 402 performs data packet relay to remote UEs 431, 432, 433 or 412 through sidelink 441, 442, 443, or 446, respectively.

Figure 5:
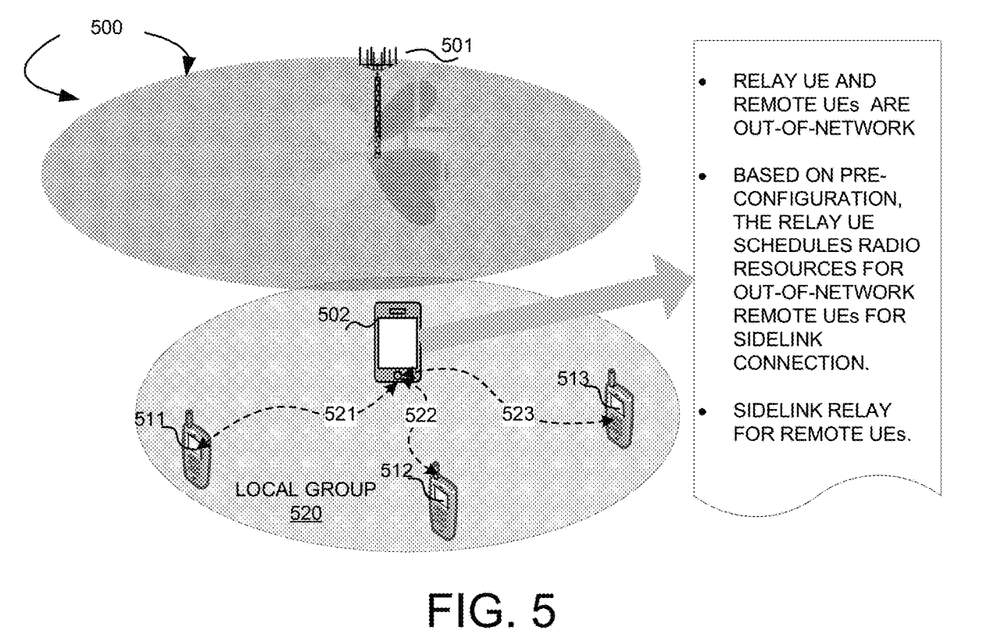
FIG. 5 illustrate an exemplary diagram of NR UE-to-UE sidelink relay with the relay UE and the remote UE out of the network coverage in accordance with embodiments of the current invention.

FIG. 5 illustrate an exemplary diagram of NR UE-to-UE sidelink relay with the relay UE and the remote UE out of the network coverage in accordance with embodiments of the current invention. The NR network 500 has a gNB 501, a relay UE 502, and remote UEs 511, 512, and 513. At the time of establishing the L2 sidelink relay path for the remote UEs, the relay UE and the remote UEs are out-of-coverage. In one embodiment, relay UE 502 acquires the network configuration for the L2 sidelink relay according to its previously connection with the network. In another embodiment, relay UE 502 obtains network configuration for the L2 sidelink relay based on its pre-configuration. Out-of-coverage remote UEs, such as UEs 511, 512, and 513, forms a local group 520. Relay UE 502 schedules the radio resources for remote UEs in local group 520. Relay UE can relay data and signaling among the device members of the local group 520, which are out of the network coverage. In one embodiment, relay UE 502 performs L2 sidelink relay through sidelinks 521, 522, and 523 with remote UEs 511, 512, and 513, respectively.

Figure 6:
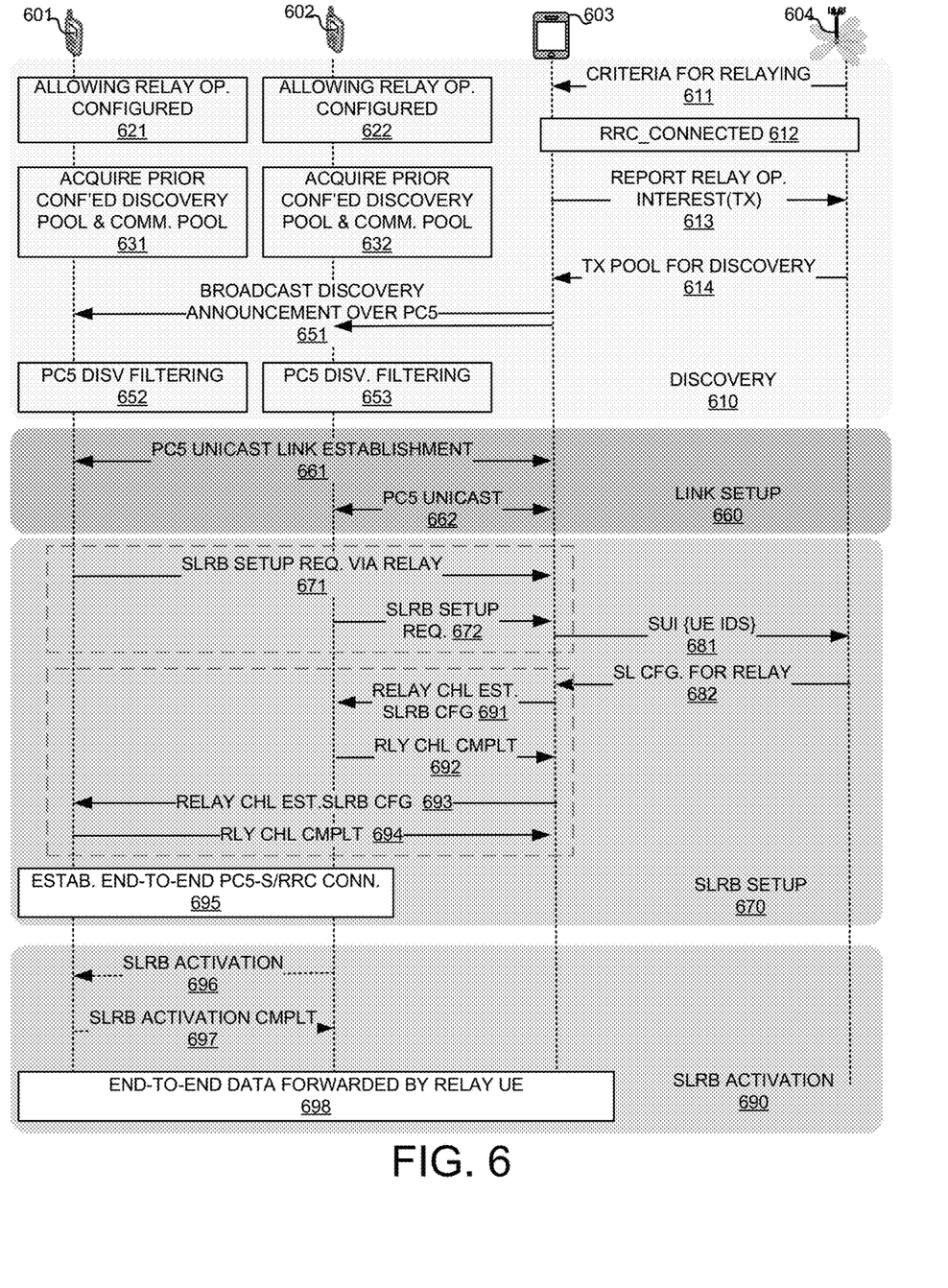
FIG. 6 illustrates exemplary diagrams for L2-based UE-to-UE sidelink relay initiation procedure in accordance with embodiments of the current invention.

FIG. 6 illustrates exemplary diagrams for L2-based UE-to-UE sidelink relay initiation procedure in accordance with embodiments of the current invention. An exemplary NR network includes a gNB 604, a relay UE 603 and remote UEs 601 and 602. In one novel aspect, the remote UEs and the relay UE(s) performs discovery procedure 610, establishes corresponding direct sidelink between the relay UE and the each remote UE as in procedure 660, set up end-to-end SLRB path as in procedure 670, and activate the endo-to-end SLRB to establish the UE-to-UE data and signal channel through the relay UE as in procedure 690. There are two modes, Mode A and Mode B, for relay discovery as described at 3GPP TS 23.003. The Mode A discovery procedure is illustrated in procedure 610. In other embodiments, Mode B discovery procedure is used for the relay UE and remote UE discovery. The sidelink establishment 660, SLRB set up 670 and SLRB activation 690 applies to the Mode B sidelink discovery.

In the first procedure, the relay UE and the remote UEs performs discovery as in 610. At step 611, the base station/gNB 604 broadcasts the criteria to relay UE 603. At step 612, relay UE 603 goes into the RRC_Connected state. At step 613, relay UE 603 reports its interests to do traffic relaying when the criteria are met. At step 621, remote UE 601 obtains an indicator of allowing relaying operation. In one embodiment, the indicator is preconfigured, such as preconfigured in USIM of the remote UE. In other embodiments, other form of configuration at the remote UE indicates allowing relaying operation. Similarly, at step 622, remote UE 602 obtains an indicator of allowing relaying operation. Upon obtaining the indicator, remote UE 601 and remote UE 602 are authorized to perform relaying operation. The authorization steps, such as steps 621 and 622, for remote UE 601 and remote UE 602 may not be synchronous. Step 613, where the relay UE reports its relay UE interests to the network, and steps 621 and 622 may not be synchronized. Steps 613, 621 and 622 can take in any order. At step 614, gNB 604 sends a transmission pool for discovery information to relay UE 603. Relay UE 603 is configured with TX resources, either Mode A or Mode B, to send Discovery Announcement after network authorization. If relay UE 603 is scheduled by Mode B, the pool needs to be aligned with the resource pools configured or preconfigured for the remote UEs 601 and 602 for Discovery monitoring. At step 631, remote UE 601 acquires discovery pool and communication pool from pre-configuration or its previous configuration during RRC_Connected mode. At step 632, remote UE 602 acquires discovery pool and communication pool from pre-configuration or its previous configuration during RRC_Connected mode. Steps 631 and 632 may not be synchronous. At step 651, relay UE 603 broadcasts discovery announcement over PC5 with Application Code or Restricted Code configured at PC5-S according to the acquired resources from step 631 and step 632. At step 652, remote UE 601 monitors the discovery announcement and take radio level RSRP/RSRQ measurements of the PC5 radio link quality. At step 653, remote UE 602 monitors the discovery announcement and take radio level RSRP/RSRQ measurements of the PC5 radio link quality. Meanwhile, the PC5-S discovery filtering is performed based on the Application Code or Restricted Code. The discovery procedure for the remote UE 601 and remote UE 602 completes if the corresponding Application Code or Restricted Code matches the corresponding filter. For steps 652 and 653, the PC5-S filtering for remote UE 601 and remote UE 602 may not be synchronous.

Upon performing the discovery procedure, the remote UEs and the relay UE establishes direct PC5 links. At step 661, the direct PC5 unicast link is established between relay UE 603 and remote UE 601 for UE-to-UE based relaying. which is managed by PC5-S signaling. At step 662, the direct PC5 unicast link is established between relay UE 603 and remote UE 602 for UE-to-UE based relaying. The direct PC5 links are managed by PC5-S signaling. The direct PC5 unicast links are established based on a default communication resource pool. The execution of steps 661 and 662 leads to the establishment of PC5-S connection between remote UE 601 and relay UE 603, and between remote UE 602 and relay UE 603. In one embodiment, when the PC5-S connection is established, an initial PC5 RRC connection can be also established between remote UE 601 and relay UE 603, and between remote UE 602 and relay UE 603. In one embodiment, UE capability of one or more remote UEs, such as remote UE 601 and remote UE 602, are reported to relay UE 603 over corresponding PC5.

Once the direct PC5 sidelink are established between the relay UE and each remote UE, the relay UE and the remote UEs performs the end-to-end SLRB setup. At step 671, remote UE 601 sends the communication request (i.e., SLRB Setup Request via relaying) at PC5 RRC layer (i.e., AS layer) or PC5-S layer (i.e., NAS layer). It performs a NAS layer new service request transmission to the relay UE 603 from the remote UE 601. Similarly, at step 672, remote UE 602 sends the communication request (i.e., SLRB Setup Request via relaying) at PC5 RRC layer (i.e., AS layer) or PC5-S layer (i.e., NAS layer). From AS layer perspective, this means new SLRB (relaying based) setup request is sent to the relay UE from the remote UEs 601 and 602. In the request, the UE ID of corresponding remote UE is provided to the relay UE to establish communication via relaying manner. The remote UE ID in the SLRB Setup Requestion message allows relay UE 603 to make the correct association for the remote UE pair.

At step 681, relay UE 603 sends a Sidelink UE information (SUI) RRC message to the gNB 604. The SUI RRC message includes the discovered remote UE IDs of remote UE 601 and remote UE 602. SUI RRC message requests relaying communication resource for both RX and TX. In one embodiment, the SUI RRC message includes the PC5 link quality for one or more relay UE and remote UE pair. In one embodiment, the remote UE ID for one or more remote UE is the Layer 2 UE ID as defined by 3GPP TS 23.003. In another embodiment, relay UE 603 reports the UE capability of remote UE 601 and/or remote 602. In some embodiments, the UE capability includes the supported frequency list and/or the UE's own capability to the BS. The gNB assigns appropriate resources for the follow-up relaying operation between remote UE 601 and remote UE 602 based on the UE capability information. At step 682, as a response to the SUI message from relay UE 603, gNB 604 configures sidelink configuration including both relaying channel configuration and end-to-end SLRB configuration to relay UE 603 with the intention to establish the necessary relaying channel(s) to perform relaying between remote UE 601 and remote UE 602. gNB 604 configures the resource pool in, either Mode A or Mode B, for both relay UE 603 and remote UEs 601 and 602. Relay UE 603 and remote UEs 601 and 602 reconfigures the two PC5 unicast link between them for relaying based on the configured resource pool. If the relay UE and the remote UEs are scheduled following Mode B, the aligned resource pool for sensing for the two UE pairs are provided via the configuration. In another embodiment, remote UE 601 and remote UE 602 configure the resources for both discovery and communication at steps 631 and 632, respectively.

In one embodiment, gNB 604 provides the configuration to relay 603 via Uu RRC message (e.g. RRC Reconfiguration). The configuration includes the relaying channel configurations for the direct PC5 link between relay UE 603 and remote UE 601 and the direct PC5 link between relay UE 603 and remote UE 602. In one embodiment, the configuration provided by gNB 604 further includes the SLRB configuration for indirect link between remote UE 501 and remote UE 602. The relaying channel configurations for the direct PC5 link includes the configuration for RLC and MAC (i.e. logical channel configuration including logical channel ID). In one embodiment, to identify the relaying channel over direct link PC5 between the relay UE and the remote UE, the logical channel ID is used as relaying channel ID. In one embodiment, relay UE 603 assigns one or more specific logical channels over PC5 for relaying purpose. In another embodiment, a specific relaying channel ID is defined. In this case, there is one to one mapping between logical channel ID and PC5 relaying channel ID. Relay UE 603 maps the ingress relaying channel ID of a relaying channel for a specific relaying data flow to an egress relaying channel during traffic forwarding and bearer mapping. In yet another embodiment, not shown in FIG. 6, relay UE 603 responds a Sidelink Configuration Complete to gNB 604 as an acknowledgement to the SL configuration for relay message from gNB 604.

Upon receiving the sidelink configuration for relay message from gNB 604, relay UE 603 sends the relaying channel establishment request via PC5 RRC message to the remote UE 601 and remote UE 602 at steps 691 and 693, respectively. The sidelink configuration for relay message configures the sidelink for each direct PC5 link between relay UE 603 and corresponding remote UEs, such as remote UE 601 and remote UE 602, according to the configurations received from gNB 604 at step 682. In one embodiment, relay UE 603 also carries the end-to-end SLRB configuration for the indirect PC5 link between remote UE 601 and remote UE 602. The end-to-end SLRB configuration is based on the configuration received from the gNB 604 at step 682. In one embodiment, the end-to-end SLRB configuration for the indirect PC5 link includes the configuration for SDAP and PDCP and end-to-end SLRB ID. In another embodiment, the configuration provided by gNB 604 in step 682 does not include the relaying channel configuration for the direct PC5 links, which are the link between relay UE 603 and remote UE 601, and the link between relay UE 603 and remote UE 602. The sidelink configuration for relay message at step 682 does not include SLRB configuration of indirect link, which is the link between remote UE 601 and remote UE 602. Relay UE 603, at steps 691 and 693, determines the configurations for the corresponding link. The contents of the configurations in steps 691 and 693 follows the contents described in step 681.

The relay channel establishment and SLRB configuration messages at steps 691 and 693 prepares the information needed for both traffic forwarding and bearer mapping for the L2 sidelink relay. Table-1 illustrates an exemplary bearer mapping table. For example, at steps 691 and 693, there are four end-to-end SLRBs configured between remote UE 601 and remote UE 602, which are SLRB-w, SLRB-x, SLRB-y and SLRB-z. There are two relaying channels configured between relay UE 603 and remote UE 601, which are Channel-a and Channel-b. There are three relaying channels configured between relay UE 603 and remote UE 602, which are Channel-1, Channel-2, and Channel-3. Both of end-to-end SLRB-w and SLRB-y are mapped to Channel-a between UE 603 and remote UE 601. Both end-to-end SLRB-x and SLRB-z are mapped to Channel-b between relay UE 603 and remote UE 601. Both end-to-end SLRB-w and SLRB-z are mapped to Channel-1 between UE 603 and remote UE 602.

TABLE 1

Exemplary End-to-End SLRB Mapping

| End-to-end SLRB Between Remote UE1 and Remote UE2 | Relaying Channel Between Relay UE and Remote UE1 | Relaying Channel Between Relay UE and Remote UE2 |
|---|---|---|
| SLRB-w | Channel -a | Channel -1 |
| SLRB-x | Channel -b | Channel -2 |
| SLRB-y | Channel -a | Channel -3 |
| SLRB-z | Channel -b | Channel -1 |

In one embodiment, the relaying channel configuration as in steps 691 and 693, triggers the update of the PC5-S link for the direct link and the reconfiguration of the RRC connection of direct link (i.e. between relay UE 603 and remote UE 601, and between relay UE 603 and remote UE 602) for relaying. In another embodiment, the SLRB configuration as in steps 691 and 693, triggers the release of the PC5-S link and/or RRC connection for the direct links. In yet another embodiment, one or more remote UEs acknowledge the establishment of the relaying channel via PC5 RRC message in Relay Channel Complete Messages as in steps 692 and 694. Remote UE 601 and remote UE 602 use PC5-S layer signaling to establish PC5-S connections at upper layer. The establishment of PC5-S connection implicitly creates the RRC connection between remote UE 601 and remote UE 602. The corresponding UE context is maintained at both remote UE 601 and remote UE 602 for pair of remote UEs. In one embodiment, the security procedure, if supported, is enabled at steps 692 and 694 for remote UE 601 and remote UE 602, respectively. At step 695, the end-to-end signaling (e.g. PC5-S or PC5-RRC) between remote UE 601 and remote UE 602 is transparently forwarded by relay UE 603 using the established relaying channel.

Once the end-to-end SLRB is configured, the remote UEs activates the configured SLRB. At steps 696, remote UE 602 indicates to remote UE 601 the activation of the SLRB configuration via PC5 RRC, and/or, PC5 MAC CE. In one embodiment, at step 691 and 693, relay UE 603 indicates which remote UE to initiate the activation to avoid cross signaling between remote UE 601 and remote UE 602. At step 697, remote UE 601 indicates to remote UE 602 the activation completion of the SLRB configuration via PC5 RRC, and/or, PC5 MAC CE. In one embodiment the SLRB is automatically (immediately) activated when remote UE 601 and remote UE 602 receives the SLRB without explicit activation at steps 696 and 697. At step 698, the data traffic is forwarded with bearer mapping at relay UE 603 with remote UE 601 and remote UE 602. In one embodiment, the traffic forwarding and bearer mapping are performed based on the mapping relations between the first identification combination and the second identification combination. The first identification combination is the combination of the end-to-end SLRB-ID and the remote UE ID. The second identification combination is the combination of the remote UE ID, and the relay channel-ID between the relay UE and the remote UE. For example, as shown in Table-1, the end-to-end SLRB-w between remote UE 601 and remote UE 602 is mapped to Channel-a between relay UE 603 and remote UE 601, which is mapped to Channel-1 between relay UE 603 and remote UE 602.

In case of one-hop sidelink relay, the relay UE translates the remote UE ID and end-to-end SLRB-ID into the relaying channel established with the right remote UE, which is identified by the remote UE ID and the channel ID. The end-to-end SLRB-ID as adaptation information is forwarded during the succeeding transmission from the relay UE to the remote UE. The remote UE ID is discarded. The remote UE uses the end-to-end SLRB-ID to correlate the data flow to the right end-to-end SLRB. In one embodiment, the end-to-end SLRB-ID is in the SL-SCH sub-header of the sidelink MAC PDU. In another embodiment, the end-to-end SLRB-ID is in the RLC header, PDCP header or any adaptation layer over PC5.

Figure 7:
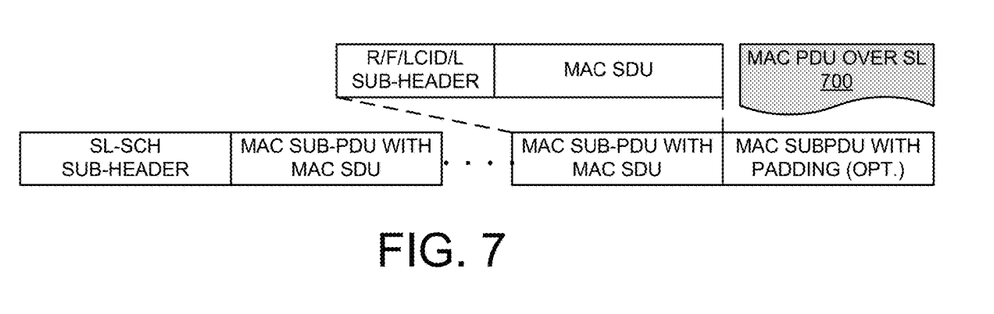
FIG. 7 illustrates an exemplary structure of MAC PDU over sidelink for communication between the two UEs in accordance with embodiments of the current invention.

FIG. 7 illustrates an exemplary structure of MAC PDU over sidelink for communication between the two UEs in accordance with embodiments of the current invention. The exemplary MAC PDU over the sidelink includes SL-SCH sub-header and multiple MAC service data units (SDUs). The SDUs are concatenated with its own sub-header, which is the R/F/LCID/L sub-header. The SL-SCH sub-header/header for L2-based sidelink relay takes different format as discussed in FIG. 8 and FIG. 9.

Figure 8:
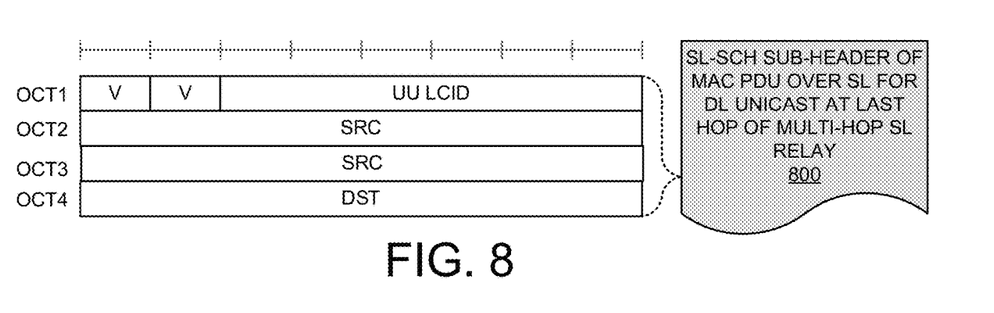
FIG. 8 illustrates an exemplary structure of SL-SCH sub-header of MAC PDU over sidelink for communication of one-hop sidelink relay and the last hop of multi-hop sidelink relay in accordance with embodiments of the current invention.

FIG. 8 illustrates an exemplary structure of SL-SCH sub-header of MAC PDU over sidelink for communication of one-hop sidelink relay and the last hop of multi-hop sidelink relay in accordance with embodiments of the current invention. SL-SCH sub-header of MAC PDU over SL is illustrated. An exemplary octet-aligned SL-SCH sub-header of MAC PDU over SL includes the following fields:

V: The MAC PDU format version number field indicates which version of the SL-SCH sub-header is used. The V field size is 4 bits;

Uu bearer ID (and/or Uu LCID): The bearer ID (and/or LCID) field. The Uu bearer ID field size is 4 bits;

SRC: The SRC field size is 16 MSB bits of Source Layer-2 ID;

DST: The DST field size is 8 MSB bits of Destination Layer-2 ID.

In SL-SCH sub-header of the MAC PDU over sidelink, the reserved bits (4 bits) in Rel-16 can be reused to express the Uu bearer ID. The V-field is used to notify the relay UE the type of MAC PDU for relaying operation, including unicast, groupcast, or broadcast.

For multi-hop sidelink relay, at the first hop, the relay UE translates the remote UE ID and the end-to-end SLRB ID into the relay channel ID and the intermediate relay UE ID according to the relaying channels established with the intermediate Relay UE. At the intermediate hop, the intermediate relay UE translates the previous intermediate relay UE ID and relaying channel ID into next intermediate relay UE ID and relaying channel ID established with the next intermediate relay UE. At the last hop, the intermediate relay UE translates the intermediate relay UE ID and relaying channel ID into the relaying channel established with the right remote UE, which is identified by the remote UE ID and the channel ID. The remote UE ID as adaptation information is forwarded during the succeeding transmission from the relay UE to the remote UE until the last hop. The end-to-end SLRB-ID as adaptation information is forwarded during the succeeding transmission from the relay UE to the remote UE from the first hop to the last hop. The remote UE uses the end-to-end SLRB-ID to correlate the data flow to the right the end-to-end SLRB. In one embodiment, the end-to-end SLRB-ID is in the SL-SCH sub-header of the sidelink MAC PDU. In another embodiment, the end-to-end SLRB-ID is in the RLC header, PDCP header or any adaptation layer over PC5.

Figure 9:
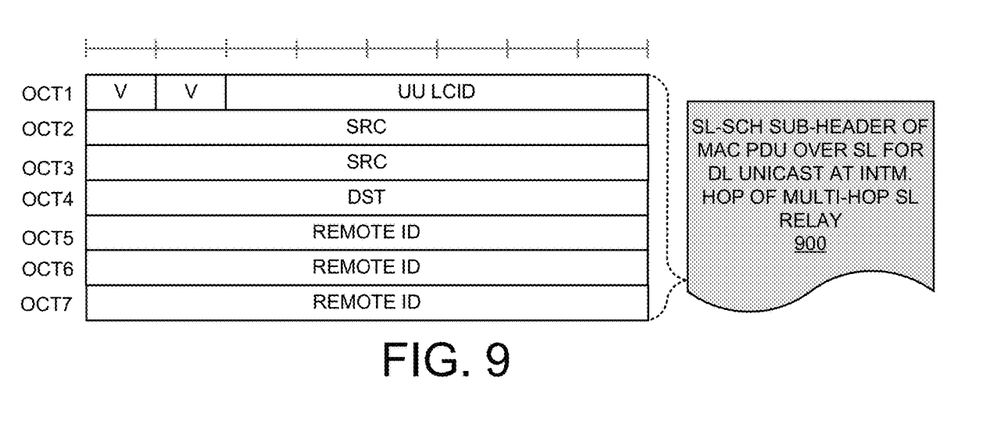
FIG. 9 illustrates an exemplary structure of SL-SCH sub-header of MAC PDU over sidelink for communication of intermediate hop of multi-hop sidelink relay in accordance with embodiments of the current invention.

FIG. 9 illustrates an exemplary structure of SL-SCH sub-header of MAC PDU over sidelink for communication of intermediate hop of multi-hop sidelink relay in accordance with embodiments of the current invention. An exemplary octet-aligned SL-SCH sub-header of MAC PDU over SL includes the following fields:

V: The MAC PDU format version number field indicates which version of the SL-SCH sub-header is used. The V field size is 4 bits;

Uu Bearer ID: The Bearer ID (LCID) field. The Uu bearer ID field size is 4 bits;

SRC: The SRC field size is 16 MSB bits of Source Layer-2 ID;

DST: The DST field size is 8 MSB bits of Destination Layer-2 ID;

Remote UE ID: The Remote UE ID field size is 24 bits in the example.

In SL-SCH sub-header of the MAC PDU over sidelink, the reserved bits (4 bits) in Rel-16 can be reused to express the end-to-end SLRB-ID. The V field is used to notify the relay UE the type of MAC PDU for relaying operation: unicast, groupcast, or broadcast. The remote UE ID in the sub-header of MAC data PDU is to enable the traffic forwarding, such as packet forwarding at MAC layer. The remote UE ID field represents the destination Layer-2 ID or other type of address ID of the final receiver. In one embodiment, the remote UE ID field is corresponding to the routing address or a specific local index applicable to the sidelink relay operation. In one embodiment, if there are multiple path between the relay UE and the destined remote UE, a path ID is included in the remote UE ID field. In another embodiment, the routing address, a specific local index, and path ID are configured by the control plane signalling. In another embodiment, one code point of the V field can be used to express this omission. This specific code point shows that the specific SL-SCH sub-header with or without remote UE ID field is used. This specific code point shows that the next hop is the final hop transmission. When the receiving relay UE correctly receives the MAC PDU, the relay UE always uses the relay UE address for succeeding transmission, replacing the address in the SRC field of the SL-SCH sub-header of the received MAC PDU. The general aspects of unicast relay operation apply also to groupcast. The difference is that the remote UE ID field in the sub-header of MAC sub-PDU is replaced by a group ID field.

The group ID represents a group address. One codepoint of the V field can be used to express the relaying groupcast traffic. Specific to the relaying groupcast traffic, when the relay UE correctly receives the MAC PDU, the MAC PDU is delivered to the upper layer for message resolution. At the same time, the relay UE generates the relay transmission via groupcast manner over sidelink.

Figure 10:
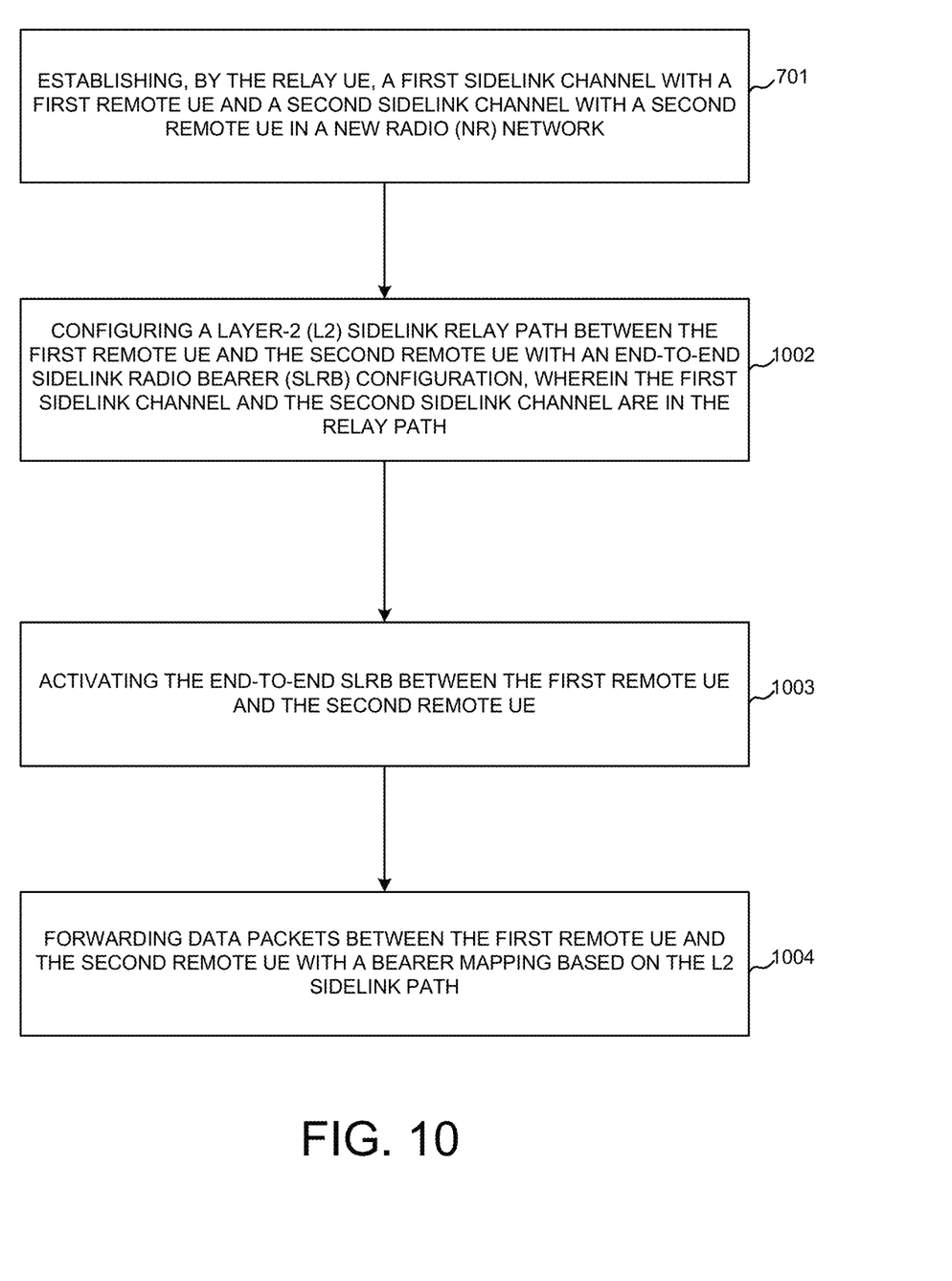
FIG. 10 illustrates an exemplary flow chart for the sidelink configuration and traffic forwarding for layer-2 UE-to-UE relay in accordance with embodiments of the current invention.

FIG. 10 illustrates an exemplary flow chart for the sidelink configuration and traffic forwarding for layer-2 UE-to-UE relay in accordance with embodiments of the current invention. At step 1001, the UE establishes a first sidelink channel with a first remote UE and a second sidelink channel with a second UE in a new radio (NR) network. At step 1002, the UE configures a L2 sidelink relay path between the first remote UE and the second remote UE with an end-to-end SLRB configuration, wherein the first sidelink channel and the second sidelink channel are in the relay path. At step 1003, the UE activates the end-to-end SLRB between the first remote UE and the second remote UE. At step 1004, the UE forwards data packets between the first remote UE and the second remote UE with a bearer mapping based on the L2 sidelink path.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method for a relay user equipment (UE), comprising:
establishing, by the relay UE, a first sidelink channel with a first remote UE and a second sidelink channel with a second remote UE in a new radio (NR) network;
configuring a Layer-2 (L2) sidelink relay path between the first remote UE and the second remote UE with an end-to-end sidelink radio bearer (SLRB) configuration, wherein the first sidelink channel and the second sidelink channel are in the relay path;
activating the end-to-end SLRB between the first remote UE and the second remote UE; and
forwarding data packets between the first remote UE and the second remote UE with a bearer mapping based on the L2 sidelink path.

2. The method of claim 1, wherein the first relay channel and the second relay channel are established based on PC5 RRC signal exchanges with the first remote UE and the second remote UE.

3. The method of claim 1, wherein the end-to-end SLRB are activated automatically upon receiving of the end-to-end SLRB configuration by the first remote UE and the second remote UE.

4. The method of claim 1, wherein the end-to-end SLRB are activated by a PC5 MAC control element (CE) between the first remote UE and the second remote UE.

5. The method of claim 1, wherein the end-to-end SLRB are activated by a PC5 RRC message between the first remote UE and the second remote UE.

6. The method of claim 1, wherein the relay UE sends a radio resource control (RRC) message with sidelink UE information (SUI) to a base station in the NR network, wherein the SUI includes a UE ID of the first remote UE and a UE ID of the second remote UE.

7. The method of claim 6, wherein the RRC message further includes one or more relay elements comprising PC5 link quality information for one or more PC5 links of the relay UE and corresponding UE capability information of the first remote UE and the second remote UE.

8. The method of claim 1, wherein the forwarding data packets is based on a remote UE ID field and an ID for the end-to-end SLRB in a MAC packet data unit (PDU) over the first or the second sidelink.

9. The method of claim 1, wherein the forwarding data packets is based on an ID for the end-to-end SLRB in a MAC packet data unit (PDU) over the first or the second sidelink.

10. The method of claim 1, wherein the bearer mapping correlates an ID of the end-to-end SLRB with at least one relay channel ID, wherein the relay channel ID corresponds to the first sidelink channel or the second sidelink channel.

11. A user equipment (UE), comprising:
a transceiver that transmits and receives radio frequency (RF) signal in a new radio (NR) wireless network;
a memory, and
a processor coupled to the memory, the processor configured to
establish a first sidelink channel with a first remote UE and a second sidelink channel with a second remote UE in a new radio (NR) network;
configure a Layer-2 (L2) sidelink relay path between the first remote UE and the second remote UE with an end-to-end sidelink radio bearer (SLRB) configuration, wherein the first sidelink channel and the second sidelink channel are in the relay path;
activate the end-to-end SLRB between the first remote UE and the second remote UE; and
forward data packets between the first remote UE and the second remote UE with a bearer mapping based on the L2 sidelink path.

12. The UE of claim 11, wherein the first relay channel and the second relay channel are established based on PC5 RRC signal exchanges with the first remote UE and the second remote UE.

13. The UE of claim 11, wherein the end-to-end SLRB are activated automatically upon receiving of the end-to-end SLRB configuration by the first remote UE and the second remote UE.

14. The UE of claim 11, wherein the end-to-end SLRB are activated by a PC5 MAC control element (CE) between the first remote UE and the second remote UE.

15. The UE of claim 11, wherein the end-to-end SLRB are activated by a PC5 RRC message between the first remote UE and the second remote UE.

16. The UE of claim 11, wherein the relay UE sends a radio resource control (RRC) message with sidelink UE information (SUI) to a base station in the NR network, wherein the SUI includes a UE ID of the first remote UE and a UE ID of the second remote UE.

17. The UE of claim 16, wherein the RRC message further includes one or more relay elements comprising PC5 link quality information for one or more PC5 links of the relay UE and corresponding UE capability information of the first remote UE and the second remote UE.

18. The UE of claim 11, wherein the forwarding data packets is based on a remote UE ID field and an ID for the end-to-end SLRB in a MAC packet data unit (PDU) over the first or the second sidelink.

19. The UE of claim 11, wherein the forwarding data packets is based on an ID for the end-to-end SLRB in a MAC packet data unit (PDU) over the first or the second sidelink.

20. The UE of claim 11, wherein the bearer mapping correlates an ID of the end-to-end SLRB with at least one relay channel ID, wherein the relay channel ID corresponds to the first sidelink channel or the second sidelink channel.

* * * * *